United States Patent [19]
Okuda

[11] Patent Number: 5,123,390
[45] Date of Patent: Jun. 23, 1992

[54] IGNITION TIMING CONTROL APPARATUS FOR AN INTERNAL COMBUSTION ENGINE

[75] Inventor: Hiroshi Okuda, Himeji, Japan

[73] Assignee: Mitsubishi Denki K.K., Tokyo, Japan

[21] Appl. No.: 629,899

[22] Filed: Dec. 19, 1990

[51] Int. Cl.⁵ .......................... F02P 5/155; F02P 5/14
[52] U.S. Cl. .................................. 123/415; 123/416;
123/424
[58] Field of Search ................ 123/416, 417, 424, 415

[56] References Cited
U.S. PATENT DOCUMENTS

| | | | |
|---|---|---|---|
| 4,036,190 | 7/1977 | Bigliani et al. | 123/416 |
| 4,063,539 | 12/1977 | Gorille et al. | 123/416 |
| 4,099,507 | 7/1978 | Pagel et al. | 123/416 |
| 4,178,893 | 12/1979 | Aoki | 123/416 |
| 4,239,024 | 12/1980 | Leichle | 123/416 |
| 4,380,983 | 4/1983 | Kobashi et al. | 123/414 X |
| 5,009,209 | 4/1991 | Okuda et al. | 123/415 |

FOREIGN PATENT DOCUMENTS

51957  3/1982  Japan .

Primary Examiner—Tony M. Argenbright
Attorney, Agent, or Firm—Sughrue, Mion, Zinn, Macpeak & Seas

[57] ABSTRACT

An ignition control apparatus for an engine which includes an ignition circuit for igniting a cylinder, and an ignition timing controller for controlling the ignition circuit so as to properly control the ignition timing of each cylinder. The ignition timing controller includes a first signal generator for generating a reference signal corresponding to a prescribed crank position of the cylinder in sync with the rotation of the engine, a second signal generator for generating a pulse signal in sync with the rotation of the engine. The pulse signal contains a prescribed number of pulses per revolution of the engine. A pulse counting circuit starts to count the number of pulses generated by the second signal generator from the time of occurence of the reference signal and generates an ignition signal for the ignition circuit so as to ignite the cylinder when it counts a prescribed number of pulses generated by the second signal generator. A counter controller controls the prescribed number of pulses to be counted by the pulse counting circuit. A starting controller may be provided for controlling the ignition circuit in such a manner that the ignition timing of the cylinder is controlled based, instead of the output signal of the pulse counting circuit on the output signal of the first signal generator during engine starting.

12 Claims, 8 Drawing Sheets

IGNITION TIMING CONTROL APPARATUS FOR AN INTERNAL COMBUSTION ENGINE

BACKGROUND OF THE INVENTION

The present invention relates to an ignition timing control apparatus for an internal combustion engine which is particularly suitable for controlling the ignition timing of a marine engine.

Figure 7:
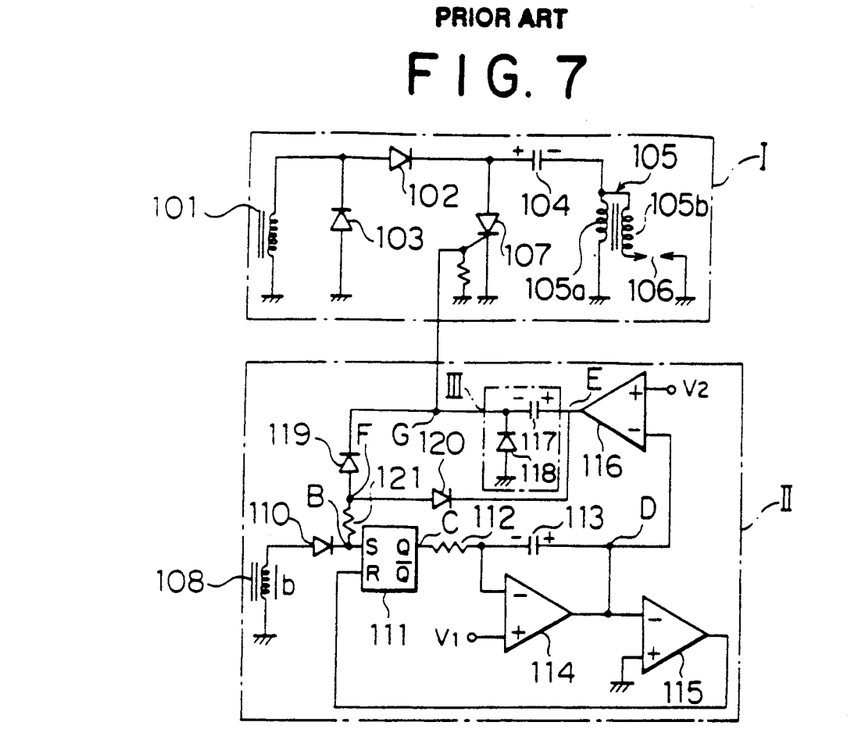
FIG. 7 is a circuit diagram of a conventional ignition timing control apparatus for an internal combustion engine.

FIG. 7 shows a circuit diagram of a conventional ignition timing control apparatus for a marine engine. The conventional ignition timing control apparatus illustrated includes an ignition device I and an ignition controller II for controlling the ignition device I. The ignition device I includes a generator coil 101 of a magneto generator which generates an alternating current output in sync with the rotation of an engine, a rectifier diode 102 for rectifying the alternating current output of the generator coil 101, and a diode 103 having an anode connected to ground and a cathode connected to a junction between the generator coil 101 and the rectifier diode 102. Ignition device I also includes a capacitor 104 which is charged by the output of the generator coil 101 through the rectifier diode 102, an ignition coil 105 having a primary winding 105a connected to the capacitor 104 and a secondary winding 105b, a spark plug 106 connected to the secondary winding 105b of the ignition coil 105 so as to generate a spark when a high voltage develops across the secondary winding 105b, and a semiconductor switching element 107 in the form of a thyristor for controlling the ignition coil 105. The thyristor 107 has an anode connected to a junction between the rectifier diode 102 and the capacitor 104, a cathode connected to ground and a control gate connected to the ignition controller II and to ground through a resistor for controlling the conduction of the thyristor 107.

The ignition controller II includes a crank position sensor 108 in the form of a signal generating coil installed, together with the generator coil 101, on the unillustrated magneto generator for generating an alternating positive and negative output in sync with the rotation of the engine, the alternating output being input to a set terminal S of a flip-flop 111 through a rectifier diode 110. As clearly shown in FIG. 8, the output signal of the signal generator 108 thus rectified by the rectifier diode 110 contains a plurality of triangular pulses of which peaks represent a predetermined crank angle or piston position of a cylinder corresponding, for example, to a maximum advanced ignition angle $T_1$. The flip-flop 111 has an output terminal connected through a resistor 112 and a capacitor 113 to an inverted or negative input terminal of a comparator 116 which has a non-inverted or positive input terminal imposed with a reference voltage $V_2$. An operational amplifier 114 has an inverted or negative input terminal connected to a junction between the resistor 112 and the capacitor 113 and a non-inverted or positive input terminal imposed with a reference voltage $V_1$, and an output terminal connected to a junction D between the capacitor 113 and the negative input terminal of the comparator 116 and at the same time to an inverted or negative input terminal of a comparator 115 which has a non-inverted or positive input terminal connected to ground and an output terminal connected to a reset terminal R of the flip-flop 111.

A pulse detecting circuit III includes a capacitor 117 having one end connected to an output terminal of the comparator 116 and the other end to the control gate of the thyristor 107 of the ignition circuit I, and a diode 118 having a cathode connected to the other end of the capacitor 117 and an anode connected to ground. A junction B between the rectifier diode 110 and the set input terminal S of the flip-flop 111 is connected to a junction G between the control gate of the thyristor 107 and the capacitor 117 through a resistor 121 and a diode 119. A junction F between the resistor 121 and the diode 119 is connected to a junction E between the output terminal of the comparator 116 and the capacitor 117 through a diode 120.

Figure 8:
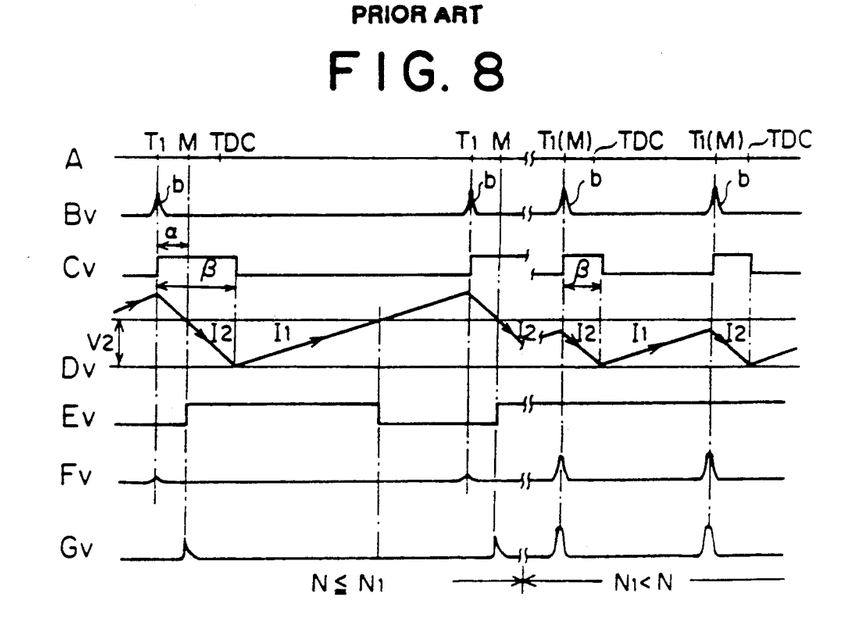
FIG. 8 is a diagrammatic view showing wave forms and pulse generation timings of signals or voltages at various portions of FIG. 7.

FIG. 8 illustrates the operational wave forms at various portions of the ignition controller II wherein reference character A designates the crank angle or position of the engine in which TDC designates top dead center, $T_1$ a maximum advanced ignition angle or position at which a pulse b is generated by the signal generator 108, and M a required or target ignition angle or position at which ignition should take place; and reference characters Bv through Gv designate the wave forms of voltages or pulses at points B through G, respectively, in FIG. 7.

Figure 9:
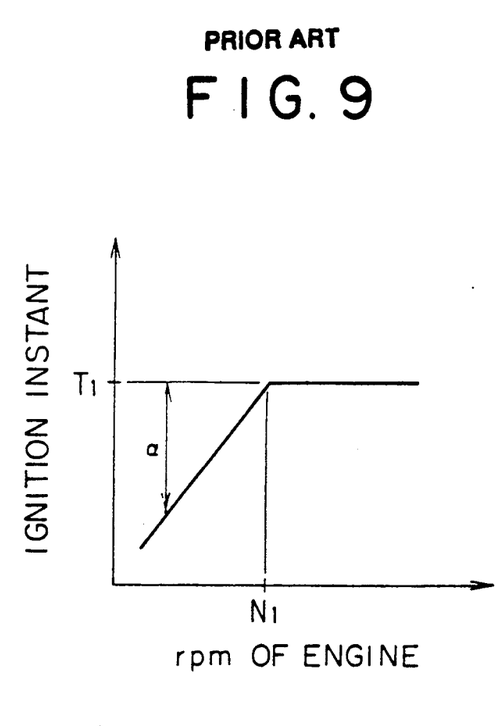
FIG. 9 is a diagrammatic representation showing the relationship between the ignition timing and the number of revolutions per minute of the engine according to the conventional ignition timing control apparatus of FIG. 7.

FIG. 9 is a diagram showing the ignition characteristic of the conventional ignition timing control apparatus of FIG. 7. As shown in FIG. 9, the ignition timing or position in the conventional apparatus is predetermined such that it is advanced at a predetermined constant rate or slope as the rotational speed or the number of revolutions per minute of the engine increases to a predetermined level $N_1$. It is constantly held of a maximum advance angle $T_1$ when and after the number of revolutions per minute of the engine has reached the level $N_1$.

The operation of the conventional ignition timing control apparatus as constructed above is as follows. First, let us consider the case in which the engine is operating at a low rotational speed N which is less than or equal to the predetermined rotational speed or the predetermined number of revolutions per minute $N_1$ (i.e., $N \leq N_1$) of FIG. 9. In this case, the signal generator 108 generates, at the maximum advance angle position $T_1$ for every revolution of the engine, an angular or positional pulse b in the form of a triangular pulse which has a narrow angular width and sharply changes. When the angular pulse b is fed through the diode 110 to the set terminal S of the flip-flop 111, the output of the flip-flop circuit 111 becomes high so that the capacitor 113, which has already been charged with a predetermined polarity as shown in FIG. 7, begins to discharge at a rate of current $I_2$ which is given by the following formula;

$I_2$ = (the high-level voltage of flip-flop 11/ − reference voltage $V_1$)/the resistance of resistor /12.

As the capacitor 113 discharges at the rate of current $I_2$, the output voltage Dv of the operational amplifier 114 decreases linearly at a constant slope as shown in FIG. 8, and when it reaches the ground potential at the positive or non-inverted terminal of the comparator 115, a positive pulse voltage is generated at the output terminal of the comparator 115. The positive pulse voltage is input to the reset terminal R of the flip-flop 111 so that the voltage at the output terminal thereof becomes low. As a result, the capacitor 113 begins to charge at a rate of current $I_1$ which is given by the following formula;

$I_1$ = reference voltage $V_1$/the resistance of resistor 112.

As can be seen from the above formulae, the charging and discharging currents $I_1$, $I_2$ of the capacitor 113 is constant even if the number of revolutions per minute of the engine changes under the condition that the high-level voltage at the output terminal of the flip-flop 111, the resistance of the resistor 112 and the reference voltage $V_1$ are all held constant. Accordingly, the charging and discharging voltages of the capacitor 113 and hence the output voltages Dv of the operational amplifier 114 fall and rise linearly at predetermined constant rates or slopes, respectively, irrespective of the number of revolutions per minute of the engine, as clearly shown by Dv in FIG. 8. In this manner, the output voltages Dv of the operational amplifier 114 begins to fall at a constant slope, which is determined by the discharging current $I_2$, from the maximum advance angle position $T_1$ at which an angular pulse b is generated by the signal generator 108. After the output voltage Dv has decreased to the ground voltage at the positive or non-inverted terminal of the comparator 115, it again begins to rise at a constant slope which is determined by the charging voltage $I_2$. The output voltage Dv of the operational amplifier 114, which changes in this manner to provide a triangular output voltage, is input to the negative or inverted input terminal of the comparator 116 where it is compared with the reference voltage $V_2$ at the positive or non-inverted input terminal thereof. As a result of this comparison, the comparator 116 generates a high-level output voltage Ev during the time when the output voltage Dv of the operational amplifier 114 is lower than the reference voltage $V_2$. The output voltage Ev is differentiated by the pulse detecting circuit III to provide a trigger voltage Gv as shown in FIG. 8. In order words, the capacitor 117 is charged by the rising or increasing output voltage Ev of the comparator 116 with a polarity as shown in FIG. 7, the charging voltage Ev generating, at location M in FIG. 8, a trigger voltage Gv for triggering the thyristor 107, as shown in FIG. 8. The charged energy of the capacitor 117 is discharged through the diode 118 during the low-level output of the comparator 116 and becomes ready for the next operation. Although the angular signal b of the signal coil 108 is input through the diode 119 to the control gate of the thyristor 107, when the number of revolutions per minute N of the engine is less than or equal to the predetermined value $N_1$, the instant at which the signal coil 108 generates an angular pulse b corresponds to the time when the output of the comparator 116 is at the low level, so the angular pulse b is absorbed into the low-level output of the comparator 116 through the diode 120 and thus it is not supplied to the control gate of the thyristor 107.

On this occasion, the trigger voltage Gv of the comparator 116 is fed to the control gate of the thyristor 107 which is thus made conductive at a crank angle or position M, thus permitting the capacitor 104 to discharge through the primary winding 105a of the ignition coil 105 whereby a high voltage is induced across the secondary winding 105b of the ignition coil 105, causing the spark plug 106 to generate a spark. As evident from the foregoing description, it will be understood that in the rotational range of the engine in which the number of revolutions per minute N thereof is less than the predetermined value $N_1$ in FIG. 9, the point in time at which the discharging output voltage Dv of the capacitor 113 reaches the reference voltage $V_2$ of the comparator 116 becomes the ignition instant at which the cylinder is fired.

Next, the case in which the number of revolutions per minute of the engine N increases above the predetermined value $N_2$ in FIG. 9 (i.e., $N > N_1$) will be described.

As the number of revolutions per minute of the engine increases toward $N_1$, the advance angle $\alpha$ proportionally decreases toward zero. That is, the instant at which a trigger voltage Gv develops advances toward the maximum advance angle position $T_1$ in proportion to the increasing rotational speed of the engine, and as the rotational speed of the engine further increases above $N_1$, the advance angle $\alpha$ becomes zero. Though the number of revolutions per minute of the engine at this time actually becomes that at the final advance angle, as the rotational speed of the engine further increases above $N_1$, the output voltage Dv of the operational amplifier 114 always remains below the reference voltage $V_2$ as clearly shown in FIG. 8 (in the range of $N > N_1$), so the output voltage Ev of the comparator 116 is accordingly held at the high level. As a result, there will be no trigger voltage Gv developed in the pulse detecting circuit III.

On the other hand, an angular pulse b generated by the signal coil 108 at the maximum advance angle position $T_1$ is input to the output terminal of the comparator 116 through the resistor 121 and the diode 120. If the number of revolutions per minute of the engine N exceeds the predetermined value $N_1$, the angular pulse b is imposed, as a trigger voltage Gv shown in FIG. 8, on the control gate of the thyristor 107 through the diode 119 to trigger the thyristor 107 into the conductive state since the output voltage Ev of the comparator 116 is always at the high level. In other words, at the high rotational speed of the engine above $N_1$, the angular pulse b generated at the maximum advance angle position $T_1$ becomes a trigger signal for determining the ignition timing of the engine, so that the ignition constantly takes place at the maximum advance angle position $T_1$ irrespective of the increasing rotational speed of the engine.

With the above-described conventional ignition timing control apparatus, the target ignition timing M is determined by the discharging time of the capacitor 113 measured from the maximum advance angle position $T_1$ corresponding to the occurrence of an angular pulse b. In this case, if the rotational speed of the engine is constant, the discharging time corresponds exactly to a prescribed crank angle $\alpha$. However, the engine repeatedly performs combustion, exhaust, intake and compression in a cyclic manner, so even within one revolution of the engine, the rotational speed thereof generally varies greatly. Accordingly, even if the discharging time of the capacitor 113 is held constant, the corresponding crank angle $\alpha$ changes depending upon variations in the rotational speed of the engine. In particular, the above variation in the rotational speed of the engine becomes remarkable in the low rotational speed range, thus preventing highly accurate ignition timing control.

SUMMARY OF THE INVENTION

Accordingly, the present invention is intended to obviate the above-described problems of the conventional ignition control apparatus.

An object of the present invention is to provide a novel and improved ignition timing control apparatus for an internal combustion engine which is able to control the ignition timing of an engine in a most accurate manner in accordance with variations in the rotational speed of the engine.

Another object of the present invention is to provide a novel and improved ignition timing control apparatus for an internal combustion engine which is able to provide accurate and stable ignition timing even at the time of engine starting or even when the engine is abnormal.

A further object of the present invention is to provide a novel and improved ignition timing control apparatus for an internal combustion engine which is able to control, upon abnormal operation of the engine, the ignition timing in the ignition retard direction, as in the engine starting period, so as to reduce the rotational speed of the engine.

With the above objects in view, the present invention provides an ignition timing control apparatus for an internal combustion engine including ignition means for igniting a cylinder and an ignition timing controller for controlling the ignition means so as to properly control the ignition timing of the cylinder.

According to one aspect of the invention, the ignition timing controller comprises a first signal generator for generating a reference signal corresponding to a prescribed crank position of the cylinder in sync with the rotation of the engine, a second signal generator for generating a pulse signal in sync with the rotation of the engine, the pulse signal containing a prescribed number of pulses per revolution of the engine, pulse counting means for starting to count the number of pulses generated by the second signal generator from the time of occurrence of the reference signal and generating an ignition signal to the ignition means so as to ignite the cylinder when it counts a prescribed number of pulses generated by the second signal generator, and a counter controller for controlling the pulse counting means so that the prescribed number of pulses to be counted by the pulse counting means is changed in accordance with the operating condition of the engine.

A throttle sensor may be provided for sensing the degree of opening of a throttle valve and controlling the counter controller so as to change the prescribed number of pulses to be counted by the pulse counting means in accordance with the number of revolutions per minute of the engine.

A timing switch may be provided for changing the output characteristic of the counter controller.

In a preferred form, the second signal generator comprises a ring gear having a plurality of teeth formed thereon in the circumferential direction thereof, the ring gear being rotatable in synchrony with the rotation of the engine, and a gear-signal pickup coil for generating an output pulse each time any one of the teeth of the ring gear passes a predetermined location.

According to another aspect of the present invention, the ignition timing controller comprises a first signal generator for generating a reference signal corresponding to a prescribed crank position of the cylinder in sync with the rotation of the engine, a second signal generator for generating a pulse signal in sync with the rotation of the engine, the pulse signal containing a prescribed number of pulses per revolution of the engine, pulse counting means for starting to count the number of pulses generated by the second signal generator from the time of occurrence of the reference signal and generating an ignition signal to the ignition means so as to ignite the cylinder when it counts a prescribed number of pulses generated by the second signal generator, a counter controller for controlling the prescribed number of pulses to be counted by the pulse counting means, and a starting controller for controlling the ignition means in such a manner that the ignition timing of the cylinder is controlled based, instead of the output signal of the pulse counting means, on the output signal of the first signal generator during engine starting.

A failure sensor may be provided for sensing a failure in the engine or in the ignition control apparatus and generating an output signal when it senses a failure. The starting controller is operable to control the ignition means in the above manner when it receives the output signal of the failure sensor.

Preferably, the starting controller comprises switching means for switching the operation of the ignition means between a first condition in which the ignition means is controlled based on the output signal of the pulse counting means and a second condition in which the ignition means is directly controlled based on the output signal of the first signal generator. The switching means is actuatable to change the operation of the ignition means into the first condition, and deactuatable to change the operation of the ignition means into the second condition.

Preferably, the starting controller further comprises a first timer for actuating the switching means after the lapse of a predetermined time from the beginning of an engine starting operation. The starting controller may further comprise a second timer for deactuating the switching means after the lapse of a predetermined time from the instant when it receives the output signal of the failure sensor.

The above and other objects, features and advantages of the present invention will become apparent from the following detailed description of a preferred embodiment of the invention taken in conjunction with the accompanying drawings.

BRIEF DESCRIPTION OF THE DRAWINGS

FIGS. 4(a-g) are a diagrammatic view showing wave forms and pulse generation timings of output and input signals of various elements of FIG. 1;

DESCRIPTION OF THE PREFERRED EMBODIMENTS

The present invention will now be described in detail with reference to a few preferred embodiments thereof as illustrated in the accompanying drawings.

Figure 1:
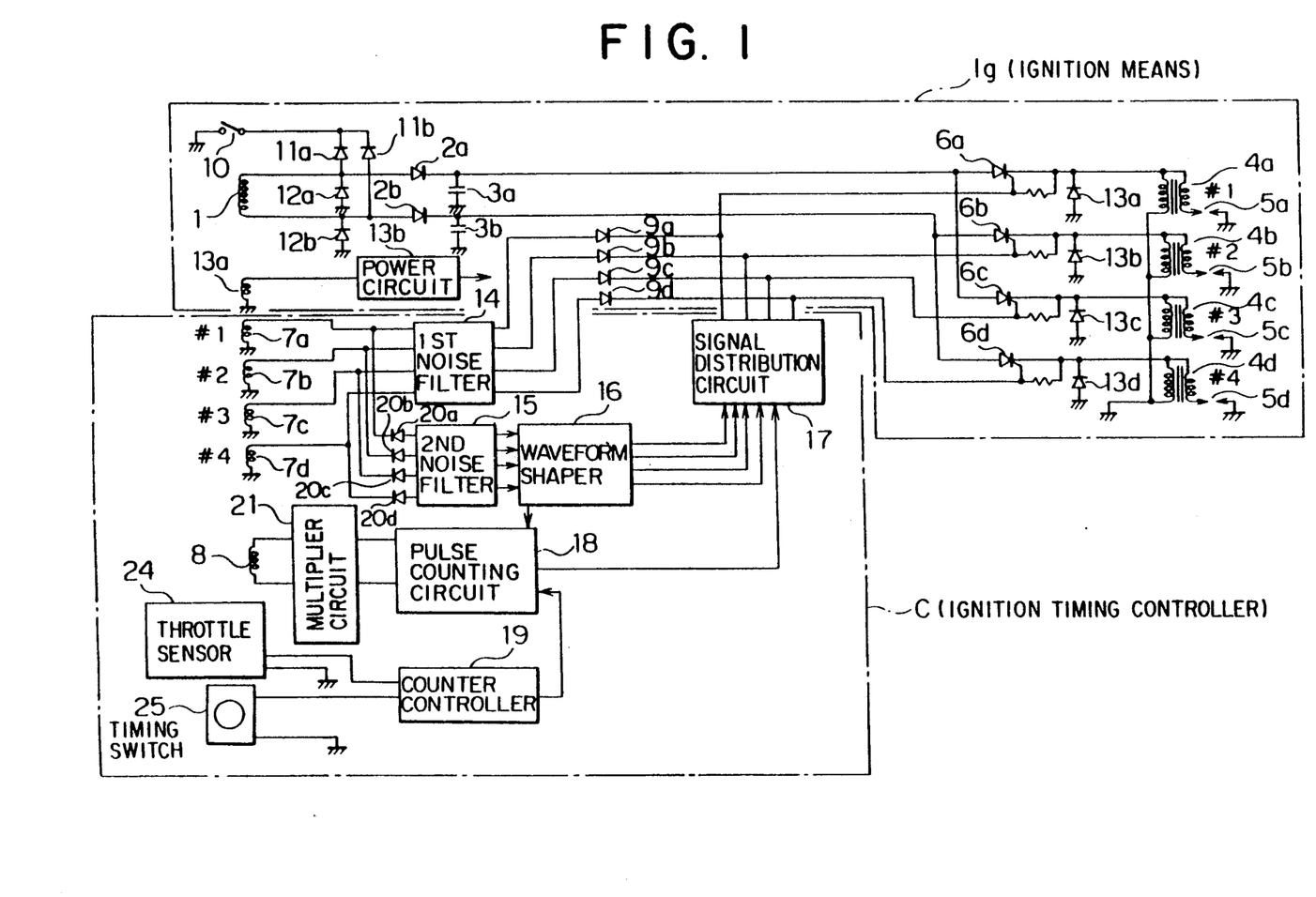
FIG. 1 is a schematic circuit diagram of an ignition timing control apparatus for an internal combustion engine in accordance with a first embodiment of the present invention.

Referring to the drawings and first to FIGS. 1 through 4, there is illustrated an ignition timing control apparatus for an internal combustion engine in accordance with a first embodiment of the invention. The apparatus is illustrated as applied to a marine engine having a plurality of (e.g., four in this embodiment) cylinders. As schematically illustrated in FIG. 1, the apparatus includes ignition means Ig for igniting cylinders (not shown) and an ignition timing controller C for controlling the ignition means Ig so as to properly control the ignition timing of each cylinder.

The ignition means Ig includes a plurality of ignition coils 4a through 4d each connected to a corresponding spark plug 5a through 5d for a corresponding cylinder, a generator coil 1 of a magneto generator for supplying a current to the respective ignition coils 4a through 4d, and a plurality of switch elements 6a through 6d in the form of thyristors for switching on and off the conduction between the generator coil 1 and the ignition coils 4a through 4d so as to develop a high voltage on each ignition coil 4a through 4d.

Specifically, the generator coil 1 has one end connected to the first and third ignition coils 4a, 4c for the first and third cylinders through a first common rectifier diode 2a and the first thyristor 6a and the third thyristor 6c, respectively, and it has the other end connected to the second and fourth ignition coils 4b, 4d for the second and fourth cylinders through a second common rectifier diode 2b and the second thyristor 6b and the fourth thyristor 6d, respectively. The generator coil 1 generates an output in the form of triangular-shaped pulses in sync with the rotation of the engine, as shown by (a) in FIG. 4. A first capacitor 3a has one end connected to the cathode of the first rectifier diode 2a and the other end grounded so that it is charged by the output current of the generator coil 1 which has been rectified into a positive direct current by the first rectifier diode 2a. Likewise, a second capacitor 3b has one end connected to the cathode of the second rectifier diode 2b and the other end grounded so that it is charged by the output current of the generator coil 1 which has been rectified into a positive direct current by the second rectifier diode 2b. The voltages across the first and second capacitors 3a, 3b are shown by (b) and (c), respectively, in FIG. 4. The opposite ends of the generator coil 1 are further connected to ground through a diode 12a and a diode 12b, respectively, and to the positive terminal of a normally open common stop switch 10 through a diode 11a and a diode 11b, respectively, the negative terminal of the stop switch 10 being connected to ground. The stop switch 10 is opened when the engine stops, and it is closed when the engine operates. A first through a fourth diode 13a through 13d have a cathode connected to one end of the corresponding first through fourth ignition coil 4a through 4d, respectively, and an anode connected to ground. A power coil 13a and a power circuit 13b are provided for supplying electric power to various electric devices including the ignition timing controller C.

The ignition timing controller C operates to control the switch elements 6a through 6d so as to properly change the ignition timing of each cylinder depending upon the operating condition of the engine. The ignition timing controller C comprises: a plurality of first signal generators 7a through 7d each in the form of a pick-up coil generating, in sync with the engine rotation, a reference signal indicative of a prescribed crank position or a reference piston position of a corresponding cylinder; a second signal generator 8 for generating a pulse signal also in sync with the engine rotation. The pulse signal contains a prescribed number of pulses per revolution of the unillustrated crankshaft of the engine. A pulse counting circuit 18 counts the number of pulses generated by the second signal generator 8 and generating an ignition signal to the ignition means Ig so as to ignite a cylinder when it has counted a prescribed number of pulses. A counter controller 19 controls the pulse counting circuit 18 so that the prescribed number of pulses to be counted by the pulse counting circuit 18 is changed in accordance with the operating condition of the engine.

Each of the pick-up coils 7a through 7d has one end grounded and the other end connected through a first noise filter 14 and through rectifier diodes 9a through 9d to the control gate of a corresponding one of thyristors 6a through 6d. Pick-up code 7a-7d are also connected to a signal distribution circuit 17 through rectifier diodes 20a through 20d, a second noise filter 15 and a waveform shaper circuit 16 which functions to shape the waveform of the noise-filtered output signal (e.g., in the form of a sinusoidal pulse) of each pick-up coil into an appropriate form (e.g., a square form). The outputs of the waveform shaper circuit 16 are also supplied to the pulse counting circuit 18. The pulse counting circuit 18 begins to count the output pulses of the second pulse generator 8 as multiplied by a multiplier circuit 21 from the time of the occurrence of a reference pulse (i.e., the rising edge of a reference pulse contained in the output of the waveform shaper circuit 16) and generates an ignition signal when it has counted a prescribed number of pulses which is defined by the counter controller 19. The ignition signal is supplied through a signal distribution circuit 17 to the control gate of a corresponding thyristor 6a through 6d of the ignition means Ig so as to make it conductive, thus causing a corresponding spark plug 5a through 5d to generates a spark.

The second signal generator 8 take the form of a gear-signal pickup coil associated with a ring gear (not shown) having a plurality of teeth formed thereon in the circumferential direction thereof, the ring gear being rotatable in sync with the rotation of the unillustrated crankshaft of the engine. The gear-signal pickup coil 8 generates an output pulse each time any one of the teeth of the ring gear passes a predetermined location. Thus, for example, the pickup coil 8 generates 90 pulses per revolution of the crankshaft.

A throttle sensor 24 senses the degree of opening of a throttle valve (not shown) and generates a corresponding output to the counter controller 19 which operates to change, based thereon, the prescribed number of pulses to be counted by the pulse counting circuit 18 in accordance with the number of revolutions per minute of the engine.

Figure 2:
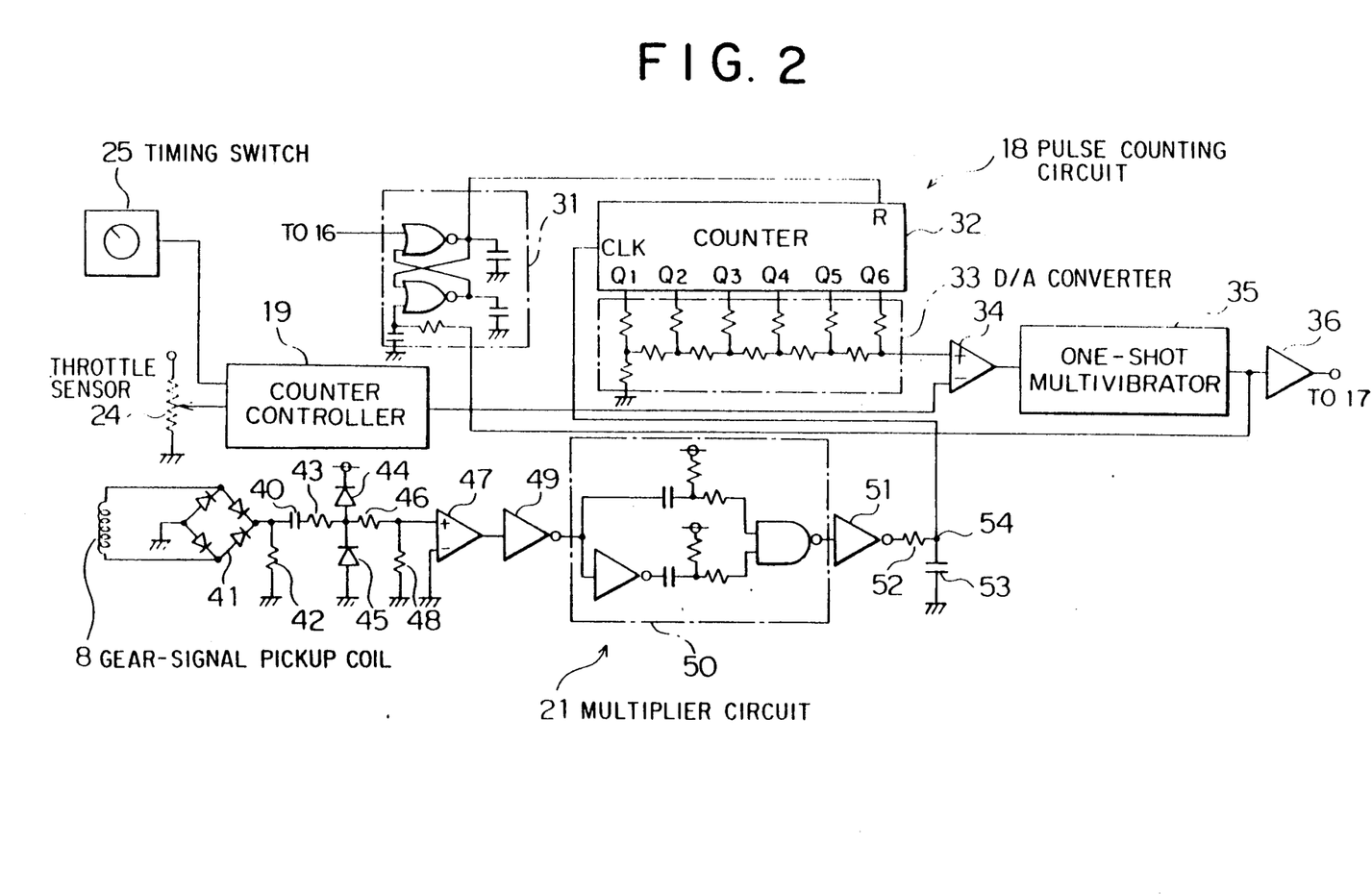
FIG. 2 is a circuit diagram showing an example of a gear pulse counting circuit and its related elements of FIG. 1.

FIG. 2 shows an example of the pulse counting circuit 18, the counter controller 19 and their related elements. In FIG. 2, the pulse counting circuit 19 comprises a flip-flop 31, a counter 32, a digital to analog converter 33, a comparator 34, a one-shot multivibrator 35 and an operational amplifier 36. The flip-flop 31 including two NOR gates, a resistor and three capacitors has a set input terminal coupled to the waveform shaper circuit 16. The counter 32 has a clock input terminal CLK connected through the multiplier circuit 21 to the gear-signal pickup coil 8, a reset terminal R coupled to the flip-flop 32, and a plurality (six in the illustrated embodiment) of output terminals Q1 through Q6 at which six different voltages each corresponding to a prescribed number of output pulses of the gear-signal pickup coil 8 fed to the clock terminal CLK through the multiplier circuit 21 are developed.

The multiplier circuit 21 is formed as follows. The gear-signal pickup coil 8, which generates 90 output pulses per rotation of the engine crankshaft, is connected to one end of a capacitor 40 through a bridge circuit 41 including four diodes connected with each other as shown in FIG. 2. A resistor 42 has one end coupled to a junction between the bridge circuit 41 and the capacitor 40 and the other end grounded. A resistor 43 has one end coupled to the other end of the capacitor 40 and the other end coupled to a junction between the anode of a diode 44 and the cathode of a diode 45. The cathode of the diode 44 is connected to the source of electricity, and the anode of the diode 45 is grounded. A resistor 46 has one end coupled to the other end of the resistor 43 and the other end coupled to the positive or non-inverted input terminal of a comparator 47 which has a negative or inverted input terminal grounded. A resistor 48 has one end coupled to a junction between the resistor 46 and the positive terminal of the comparator 47 and the other end grounded. The comparator 47 has an output terminal coupled to an input terminal of an inversion amplifier 49. An amplification circuit 50 including an inversion amplifier, resistors, capacitors and a NAND gate is coupled to an output terminal of the inversion amplifier 49. An inversion amplifier 51 has an input terminal coupled to the amplification circuit 50 and an output terminal coupled to one end of a resistor 52 which is coupled at the other end thereof to one end of a capacitor 53 which is grounded at the other end thereof. A junction 54 between the resistor 52 and the capacitor 53 is connected to the clock input terminal of the counter 32. Thus, the output pulses of the gear-signal pickup coil 8, which are generated at a rate of 90 pulses per revolution of the crank shaft, is multiplied by four times under the action of the multiplier circuit 21 and input as clock pulses to the clock input terminal of the counter 32.

The digital to analog (D/A) converter 33 is in the form of a rudder circuit including a resistance circuit network and has a plurality (six in the illustrated example) of input terminals coupled to the corresponding output terminals Q1 through Q6 of the counter 32, and an output terminal connected to a positive or non-inverted input terminal of the comparator 34 which has a negative or inverted input terminal connected through the counter controller 19.

The counter controller 19 in the form a function generator is coupled to the throttle sensor 24 for generating a voltage as a function of the output voltage of the throttle sensor 24. The throttle sensor 24 in the form of a potentiometer has one end coupled to the source of electricity and the other end grounded and generates an output voltage corresponding to the opening degree of a throttle valve (not shown). For example, the output voltage of the throttle sensor 24 varies linearly in proportion to the opening degree of the throttle valve, as shown by the dashed line in FIG. 3. For example, the output voltage Vs of the function generator 24 takes a first constant value V1 when the opening degree of the throttle valve is in the range of from 0 to a first prescribed degree $\theta1$, then decreases as the opening degree of the throttle valve increases from the first degree $\theta1$ to a second prescribed degree $\theta2$, and finally takes a second constant value V2 as the opening degree of the throttle valve further increases from the second degree $\theta2$, as clearly shown by the solid line in FIG. 3.

Figure 3:
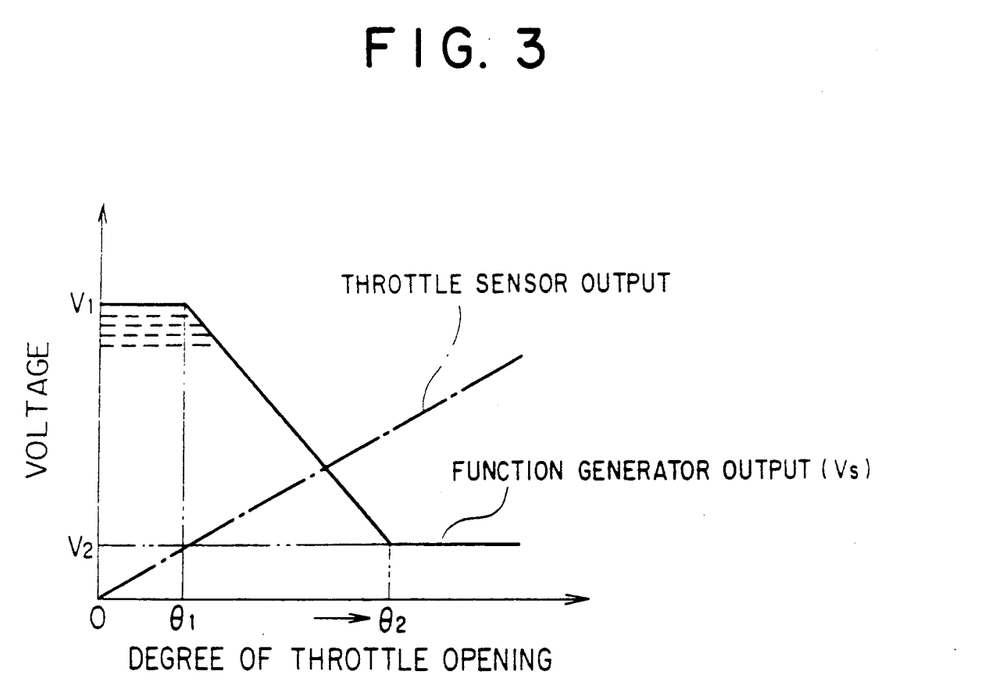
FIG. 3 is a diagrammatic view showing an example of the relationship between the output of a counter controller and the output signal of a throttle sensor of FIG. 1.

A timing switch 25 is connected to the function generator 19 for changing the output characteristic thereof in such a manner that the initial constant range of the output voltage Vs of the function generator 19 is varied in a parallel fashion, as shown by broken lines in FIG. 3.

The comparator 34, which has the positive input terminal coupled to the output side of the D/A conversion circuit 33 and a negative input terminal coupled to the output side of the function generator 19, generates an output signal when the output of the D/A converter 33 is greater than the output of the function generator 19. The one-shot multivibrator circuit 35 has an input side coupled to the output terminal of the comparator 12 and an output side coupled to the reset terminal of the flip-flop 31 and to an input terminal of the amplifier 36 which has an output terminal connected to the signal distribution circuit 17.

Figure 4:
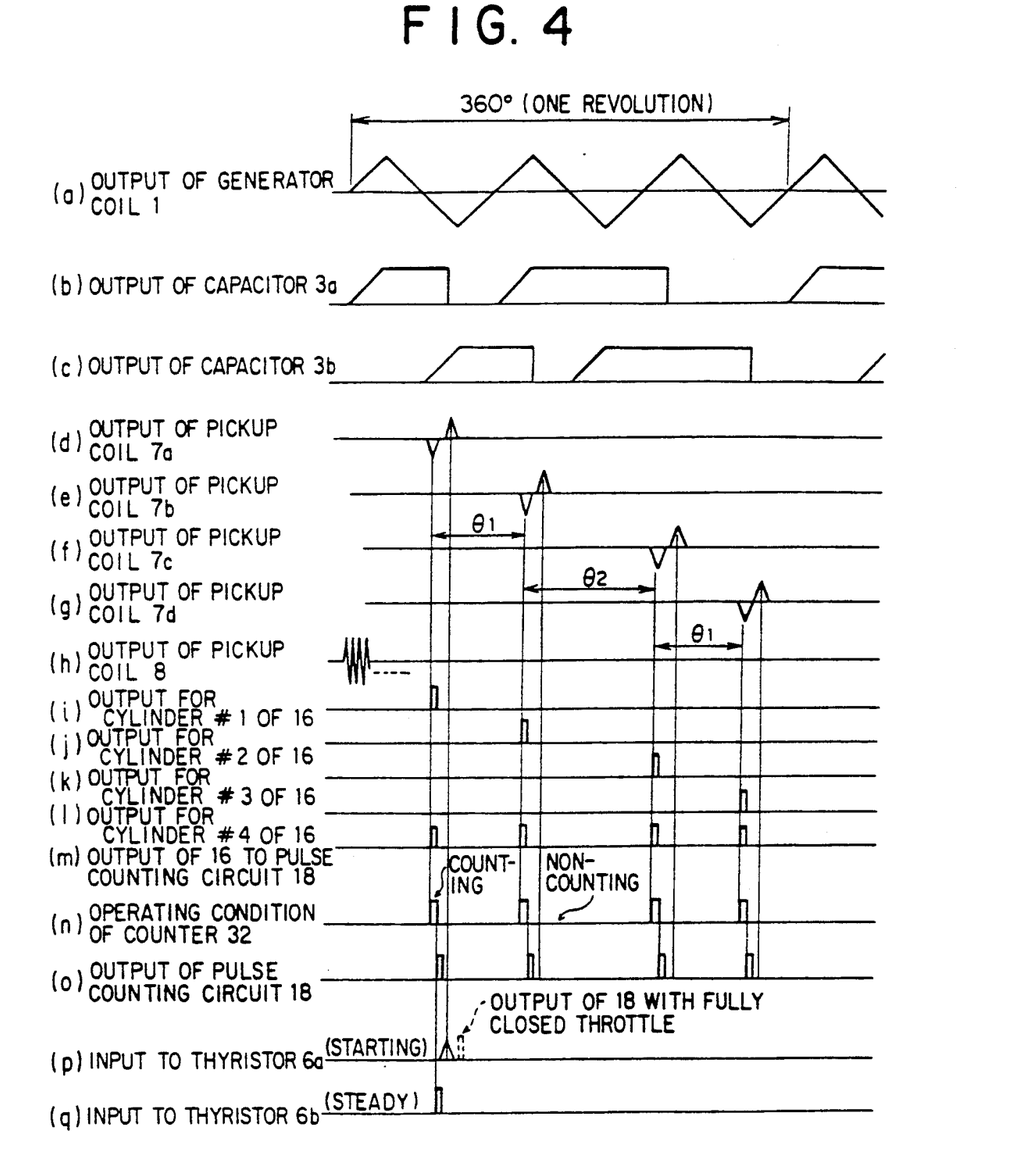

FIG. 4 illustrates the operational waveforms and pulse timings of the various elements of the above-described embodiment. In FIG. 4, (a) represents the waveform of the output of generator coil 1, (b) the waveform of the voltage across the first capacitor 3a, (c) the waveform of the voltage across the second capacitor 3b, (d) the waveform of the output signal of the pickup coil 7a, (e) the waveform of the output signal of the pickup coil 7b, (f) the waveform of the output signal of the pickup coil 7c, (g) the waveform of the output signal of the pickup coil 7d, (h) the waveform of the output signal of the gear-signal pickup coil 8, (i) the wave form of the output signal of the waveform shaper circuit 16 for cylinder #1, (j) the wave form of the output signal of the waveform shaper circuit 16 for cylinder #2, (k) the wave form of the output signal of the waveform shaper circuit 16 for cylinder #3, (l) the wave form of the output signal of the waveform shaper circuit 16 for cylinder #4, (m) the wave form of the output signal of the waveform shaper circuit 16 to the pulse counting circuit 18, (n) the operating state of the pulse counter 32, (o) the waveform of the output signal of the pulse counting circuit 18, (p) the waveform of the input signal to the control gate of the thyristor 6a for cylinder #1 during engine starting in which the phantom line designates the output signal of the pulse counting circuit 18 when the throttle valve is fully closed, and (q) the waveform of the input signal to the control gate of the thyristor 6a for cylinder #1 when the engine operates in a steady state.

The operation of the above-described ignition timing control apparatus is as follows. First, each of the reference-signal pickup coils 7a through 7d generates a pulse signal containing positive and negative pulses (only two pulses are illustrated here for simplification of explanation) at predetermined crank or rotational positions of the rotation shaft of the magneto generator (not shown), as shown by (a) in FIG. 4, as the magneto generator rotates. The pulse signals thus produced by the pickup coils 7a-7d are fed to the control gates of the thyristors 6a-6d through the first noise filter 14 and the diodes 9a-9d each having a normal polarity, and at the same time to the waveform shaper circuit 16 through the diodes 20a-20d each having a reverse polarity and the second noise filter 15. Thus, due to the normal polarity of each diode 9a-9d, only the positive pulses are fed to the thyristors 6a-6d for triggering them into conductive states. On the other hand, due to the reverse polarity of each diode 20a-20d, only negative pulses are fed to the waveform shaper 16 wherein they are each waveform shaped to provide rectangular-shaped pulses. The rectangular-shaped pulses are then fed from the waveform shaper circuit 16 to the signal distribution circuit 17 and at the same time to the set input terminal of the flip-flop 31 of the pulse counting circuit 18. The pulse signal fed from the waveform shaper circuit 16 to the flip-flop 31 contains rectangular pulses corresponding to the negative pulses of the output signals of the pickup coils 7a-7d, as shown by (m) in FIG. 4. As a result, each time a rectangular pulse is fed to the set input terminal of the flip-flop 31, the output at the inverted output terminal thereof goes to a low level, so that the counter 32 begins to operate.

On the other hand, the gear-signal pickup coil 8 generates a high-frequency wave signal, as shown by (h) in FIG. 4, as the ring gear (not shown) operatively connected with the crankshaft (not shown) rotates. The high-frequency wave signal thus generated contains triangular-shaped sharp pulses each corresponding to the respective one of the teeth formed on the ring gear. In the illustrated example, the pickup coil 8 generates 90 pulses per rotation of the crankshaft. The high-frequency wave signal of the gear-signal pick-up coil 8 is imposed on the comparator 47 where it is waveform shaped and then supplied through the inversion amplifier 49 to the amplifier circuit 50 which provides rectangular-shaped clock pulses having a frequency four times greater than that of the original wave signal. The clock pulses thus produced are input from the amplifier circuit 50 to the clock input terminal CLK of the counter 32 through the inversion amplifier 51 and the resistor 52 so that the counter 32 counts the number of the clock pulses thus input and produces a digitized signal in the form of a binary code representative of the counted clock pulse number at the output terminals Q1-Q6 each time when the number of the input clock pulses counted reaches six predetermined levels. For example, the output terminals Q1-Q6 correspond respectively to six different but successive counting levels, the terminal Q1 corresponding to the lowest one and the terminal Q6 to the highest one. The digitized output thus produced is passed through the D/A conversion circuit 33 so that it is converted into an analog voltage of stepped form. The stepped voltage thus obtained by the D/A conversion circuit 33 is imposed on the non-inverted input terminal of the comparator 34. On the other hand, imposed on the inverted input terminal of the comparator 34 is the output voltage Vs which is produced based on the output voltage of the throttle sensor 24 by the function generator 19.

Accordingly, the comparator 34 compares the output voltage of the D/A converter 33 with the output voltage Vs of the function generator 19 so that when the output voltage of the D/A converter 33 increases to a level higher than the function generator output voltage Vs, the output of the comparator 34 changes from the low to the high level. The high-level output of the comparator 34 triggers the one-shot multivibrator circuit 35 to produce a waveform-shaped pulse signal which is in turn amplified by the amplifier 36 to provide an ignition timing control signal, as shown by (o) in FIG. 4. The ignition timing control signal is fed to the signal distribution circuit 17 and then appropriately distributed therefrom to the control gates of the thyristors 6a-6d based on the output signals of the waveform shaper circuit 16. In this connection, though the positive pulses of the output signals of the pickup coils 7a-7d are also input to the control gates of the thyristors 6a-6d through the first noise filter 14 and the diodes 9a-9d, as referred to before, the output pulses of the pulse counting circuit 18 take place prior to the corresponding positive pulses of the pickup coils 7a-7d, as can be seen from FIG. 4, so that the thyristors 6a-6d are turned to the conductive states by the output pulses of the pulse counting circuit 18 before the positive pulses from pickup coils 7a-7d, thereby causing a proper spark plug 5a-5d to generate a spark. At the same time, the output signal of the one-shot multivibrator circuit 36 is also input to the reset input terminal of the flip-flop 31 so that the flip-flop 31 is reset to return the output thereof to the high level. As a result, the high-level output of the flip-flop 31 is input to the reset terminal R of the counter 32 whereby the counter 32 is reset to stop counting and placed in a condition ready for the next counting. In addition, the operation of the counter 32 is shown by (n) in FIG. 4 in which the counting periods of counter 32 are indicated by the width of each rectangular-shaped pulse.

As apparent from the foregoing description, the ignition takes place at the time when the number of pulses generated by the gear-pulse pickup coil 8 and counted by the counter 32 exceeds a reference level which is determined by the output of the counter controller or the function generator 19. Since the number of pulses generated by the gear-pulse pickup coil 8 for one revolution of the crankshaft is constant irrespective of a change in the number of revolutions per minute of the engine, the number of clock pulses counted by the counter 32 from the time of occurrence of a negative pulse of a reference-signal pickup coil 7a-7d until the time it exceeds a prescribed output level of the counter controller 19 is held constant even if the number of revolutions per minute of the engine changes. Accordingly, the ignition timing of the engine can be controlled in a highly accurate manner. Further, the ignition timings can also be controlled in accordance with the degree of opening of the throttle valve, i.e., the output signal from the throttle sensor 24, so that accelerating or decelerating performance of the engine is improved. Moreover, the ignition timings can be changed by means of the timing switch 25 so as to control the rotational speed of the engine particularly at low speeds such as during trolling operation of a boat with the throttle valve fully closed. This provides stable speed control at low speeds.

With the above-described embodiment, however, the following problems arise. When starting the engine, the source voltage for electric control circuits (such as the pulse counting circuit 18) is often insufficient, such that the ignition timing control may become inaccurate.

Further, dislocation or poor electrical connection of the throttle sensor 24, breaks in the wiring thereof and the like could also result in inaccurate ignition timing control. Moreover, if the engine continues to run at high speeds while there is an abnormality such as overheating, it could be seriously damaged.

Figure 5:
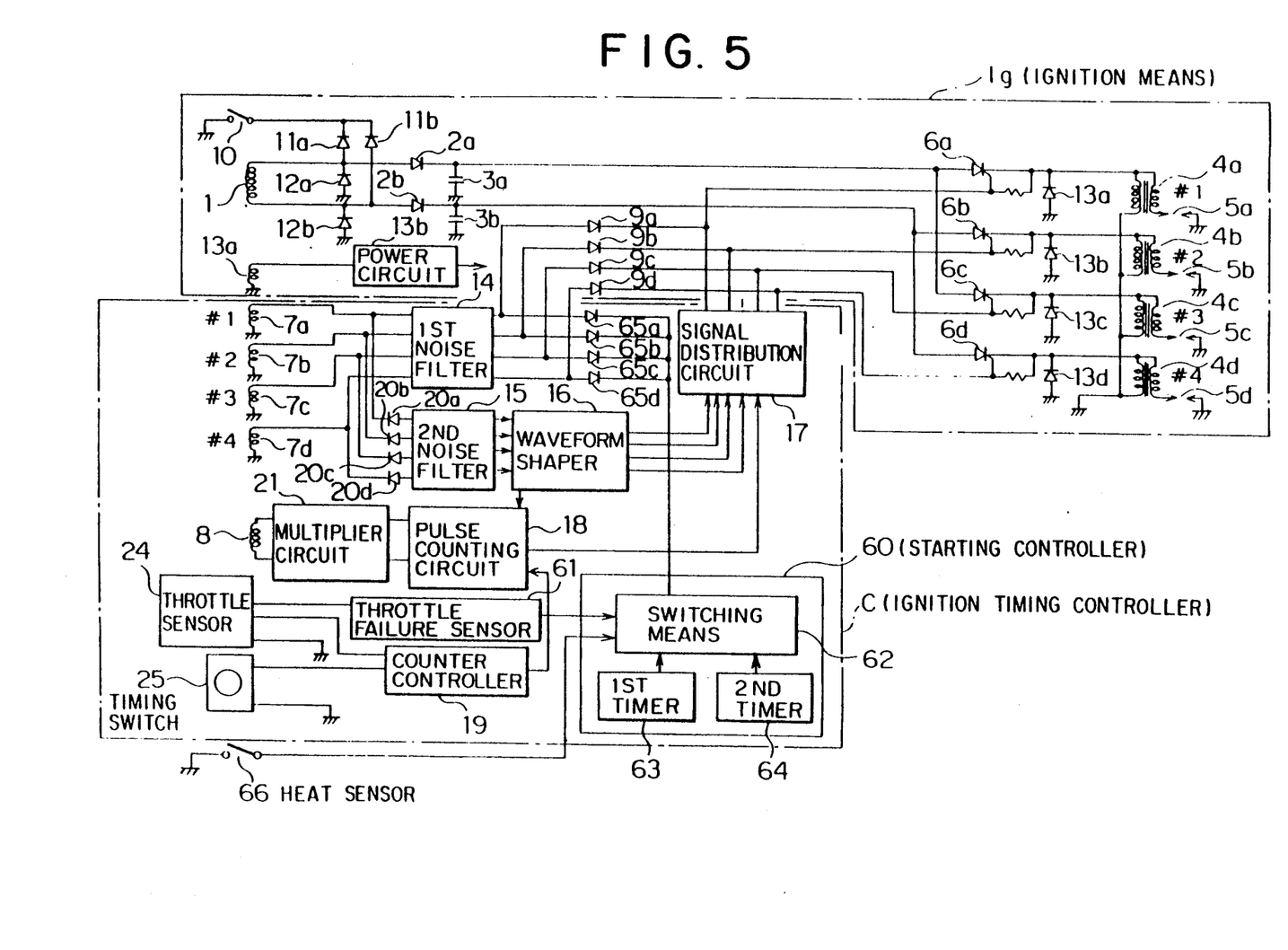
FIG. 5 is a view similar to FIG. 1, but showing another embodiment of the present invention.

FIG. 5 illustrates another embodiment of the present invention which is substantially similar in construction and operation to the first embodiment of FIG. 1 except for the following. Namely, a starting controller 60 is provided for controlling the ignition means Ig in such a manner that control of the ignition timing of the cylinders is based on the output signal of the first signal generators or reference-signal pickup coils 7a–7d during engine starting or abnormal operation of the engine (not upon the pulse counting circuit 18's output signal). A first failure sensor 61 in the form of a throttle failure sensor and a second failure sensor 66 in the form a heat sensor are provided for sensing abnormalities in the engine or in the ignition control apparatus and generating an output signal when they sense an abnormality or a failure. The starting controller 60 is operable to control the ignition means Ig in the above manner when it receives the output signal of the failure sensor 61 or the heat sensor 66.

The starting controller 60 comprises switching means 62 for switching the operation of the ignition means Ig between a first condition in which the ignition means Ig is controlled based on the output signal of the pulse counting circuit 18 and a second condition in which the ignition means Ig is directly controlled based on the output signals of the reference-signal pickup coils 7a–7d. The switching means 62 is actuatable to change the operation of the ignition means Ig into the first condition such as when the engine is being started, and deactuatable to change the operation of the ignition means Ig into the second condition.

A first timer 63 is provided for actuating the switching means 62 after the lapse of a predetermined time from the beginning of an engine starting operation. A second timer 64 is also provided for deactuating the switching means 62 after the lapse of a predetermined time from the instant when it receives the output signal of the failure sensor 61 or the heat sensor 66.

Figure 6:
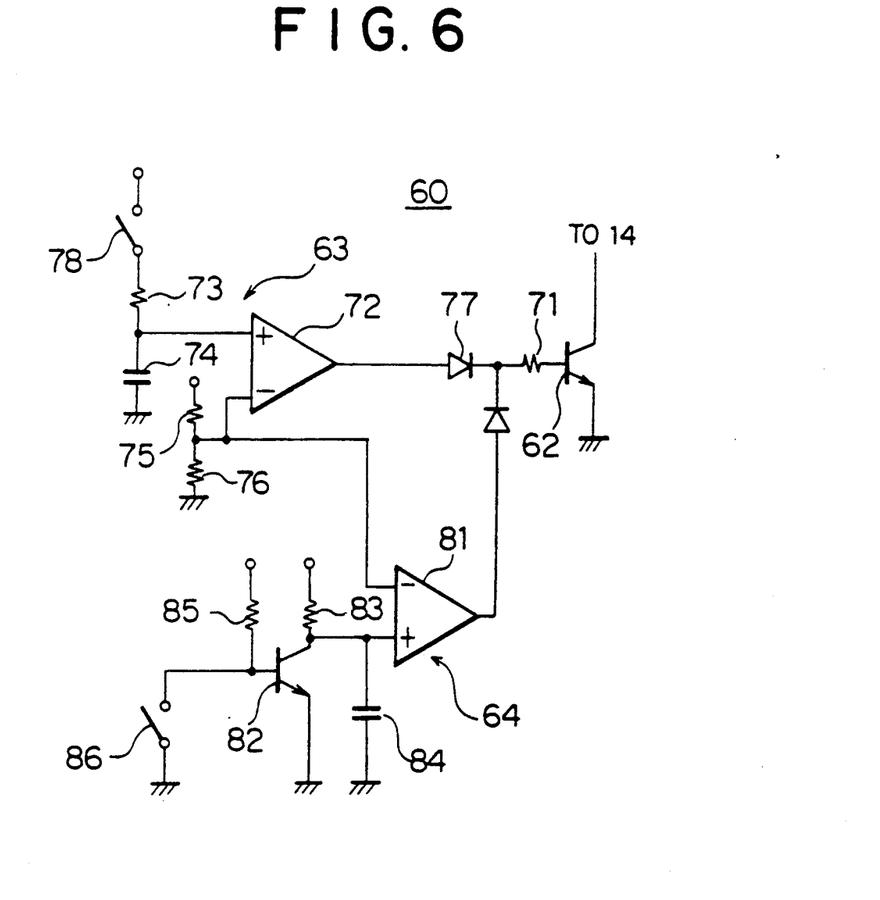
FIG. 6 is a circuit diagram showing an example of a starting controller of FIG. 5.

FIG. 6 illustrates a concrete example of the starting controller 60. In this figure, the switching means 62 comprises a transistor which has a base connected via a resistor 71 to a first and a second timer 63, 64, a collector commonly connected through diodes 65a–65d to the outputs of the first noise filter 14, and an emitter grounded. A first timer 63 is connected to the base of the transistor 62 for turning it on when a prescribed time (e.g., 11 seconds) has elapsed from the instant when the failure sensor 61 generates an output signal. The first timer 63 comprises a comparator 72 having a first positive or non-inverted input terminal connected to a junction between a resistor 73 and a capacitor 74 which are series connected at their one end with each other, a second negative or inverted input terminal connected to a junction between resistors 75, 76 which are series connected between a power supply and ground, and an output terminal connected through a diode 77 to the resistor 71. The other end of the resistor 73 is connected through a starter key 78 to a power supply, and the other end of the capacitor 74 is connected to ground. When the starter key 78 is turned on (closed), the capacitor 74 begins to be charged by the power supply via the starter key 78 and the resistor 74.

When the voltage across the capacitor 74 exceeds a reference voltage level imposed on the second negative input terminal of the comparator 72 after the lapse of a predetermined time (e.g., 11 seconds), the comparator 72 begins to generate an output which is fed through the diode 77 and the resistor 71 to the base of the transistor 62 and turns it on. As a result, the outputs of the first noise filter 14 are short-circuited to ground through the now conductive transistor 62, thus allowing the ignition means Ig to be controlled by the output signal of the pulse counting circuit 18. Thus, the ignition means Ig is controlled by the output signals of the reference-signal pickup coils 7a–7d during the engine starting period, that is from the closing of the starter switch 78 until the transistor 62 is turned on.

The second timer 64 is also connected to the base of the transistor 62 for turning it on when a prescribed time (e.g., 3 seconds) has elapsed from the instant when the heat sensor 66 is turned on. The second timer 64 comprises a comparator 81 which has a first positive or non-inverted input terminal connected to a collector of a transistor 82 which is connected through a resistor 83 to a power supply, and a negative or inverted input terminal connected to the junction between the resistors 75, 76. A capacitor 84 has one end connected to ground and the other end thereof to a node between the collector of the transistor 82 and the positive terminal of the comparator 81. The transistor 82 has a base connected to a power supply via a resistor 85 and at the same time to ground through a switch 86 which is closed by the throttle failure sensor 61 or the heat sensor 66, and an emitter connected to ground. When the throttle failure sensor 61 senses a failure of the throttle sensor 24 or when the heat sensor 66 senses that the ambient temperature of the engine exceeds a prescribed level, the switch 86 is closed to turn on the transistor 82, thus allowing the capacitor 84 to begin to discharge. Thus, when the voltage across the capacitor 84 (i.e., the voltage at the positive input terminal of the comparator 81) drops below the reference voltage at the negative terminal of the comparator 81 after the lapse of a predetermined time (e.g., 3 seconds), the output of the comparator 81 becomes low, turning off the transistor 62. As a result, the short-circuiting of the first noise filter 14 through the transistor 62 is stopped so that the output signals of the first noise filter 14 are fed to the control gates of the corresponding thyristors 6a–6d so as to control the ignition timings of the cylinders. Therefore, the ignition timings are retarded from the normal ignition timings which are determined by the output signal of the pulse counting circuit 18, reducing the rotational speed of the engine.

What is claimed is:

1. An ignition control apparatus for an internal combustion engine comprising:
    ignition means for igniting a cylinder; and
    an ignition timing controller for controlling said ignition means so as to properly control the ignition timing of said cylinder;
    said ignition timing controller including:
    a first signal generator for generating a reference signal corresponding to a prescribed crank position of said cylinder in synchrony with the rotation of the engine;
    a second signal generator for generating a pulse signal in synchrony with the rotation of the engine, said pulse signal containing a prescribed number of pulses per revolution of the engine;

a throttle sensor for sensing the degree of opening of a throttle valve;

pulse counting means for starting to count the number of pulses generated by said second signal generator from the time of occurrence of the reference signal;

a counter controller for controlling said pulse counting means so that the prescribed number of pulses to be counted by said pulse counting means is changed in accordance with a position sensed by said throttle sensor; and a comparator for continuously comparing the count of the pulse counting means with an output of said counter controller, said comparator initiating an ignition signal used to ignite the cylinder when said count exceeds the counter controller output.

2. An ignition control apparatus according to claim 1, wherein said throttle sensor controls said counter controller so as to change the prescribed number of pulses to be counted by said pulse counting means in accordance with the number of revolutions per minute of the engine.

3. An ignition control apparatus according to claim 2, further comprising a timing switch for changing the output characteristic of said counter controller.

4. An ignition control apparatus according to claim 1, wherein said second signal generator comprises:

a ring gear having a plurality of teeth formed thereon in the circumferential direction thereof, said ring gear being rotatable in synchrony with the rotation of said engine; and a gear-signal pickup coil for generating an output pulse each time any one of the teeth of said ring gear passes a predetermined location.

5. An ignition control apparatus according to claim 4, further comprising a multiplier for properly multiplying the number of pulses generated by said gear-signal pickup coil and generating an output signal to said pulse counting means.

6. An ignition control apparatus for an internal combustion engine comprising:

ignition means for igniting a cylinder; and an ignition timing controller for controlling said ignition means so as to properly control the ignition timing of said cylinder;

said ignition timing controller including:

a first signal generator for generating a reference signal corresponding to a prescribed crank position of said cylinder in synchrony with the rotation of the engine;

a second signal generator for generating a pulse signal in synchrony with the rotation of the engine, said pulse signal containing a prescribed number of pulses per revolution of the engine;

pulse counting means for starting to count the number of pulses generated by said second signal generator from the time of occurrence of the reference signal and generating an ignition signal to said ignition means so as to ignite the cylinder when it counts a prescribed number of pulses generated by said second signal generator;

a counter controller for controlling the prescribed number of pulses to be counted by said pulse counter means; and a starting controller for controlling the ignition timing of said cylinder based upon the output signal of said first signal generator during engine starting, said starting controller further comprising a first timer for instructing said starting controller to switch control of said cylinder to the pulse counting means after a predetermined lapse of time from the beginning of an engine starting operating.

7. An ignition control apparatus according to claim 6, further comprising a failure sensor for sensing a failure in at least one of the engine and the ignition control apparatus, and for generating an output signal when a failure is sensed, said starting controller being operable to control said ignition means when said starting controller receives the output signal of said failure sensor.

8. An ignition control apparatus according to claim 6, wherein said starting controller comprises switching means for switching the operation of said ignition means between a first condition in which said ignition means is controlled based on the output signal of said pulse counting means and a second condition in which said ignition means is directly controlled based on the output signal of said first signal generator, said switching means being actuatable to change the operation of said ignition means into the first condition, and deactuatable to change the operation of said ignition means into the second condition.

9. An ignition control apparatus according to claim 8, wherein said starting controller further comprises a first timer for actuating said switching means after the lapse of a predetermined time from the beginning of an engine starting operation.

10. An ignition control apparatus according to claim 7, wherein said starting controller comprises switching means for switching the operation of said ignition means between a first condition in which said ignition means is controlled based on the output signal of said pulse counting means and a second condition in which said ignition means is directly controlled based on the output signal of said first signal generator, said switching means actuatable to change the operation of said ignition means into the first condition when the engine is being started, and deactuatable to change the operation of said ignition means into the second condition.

11. An ignition control apparatus according to claim 9, wherein said starting controller further comprises a second timer for deactuating said switching means after the lapse of a predetermined time from the instant when it receives the output signal of said failure sensor.

12. The ignition control apparatus of claim 1, wherein said pulse counting means includes:

a counter for outputting multiple voltage levels, each of which corresponds to a prescribed number of pulse signals from the second signal generator;

a comparator for comprising the counter output voltage with a counter controller output signal, and a multivibrator for generating said ignition signal when the comparator indicates that the counter output voltage level exceeds the counter controller output signal level.

* * * * *